(12) United States Patent
Barth et al.

(10) Patent No.: US 12,015,532 B2
(45) Date of Patent: Jun. 18, 2024

(54) COMPONENT-BASED RISK EVALUATION TECHNIQUES USING PROCESSING FLOW SIGNATURES

(71) Applicant: PayPal, Inc., San Jose, CA (US)

(72) Inventors: Jonathan Steele Barth, Payson, AZ (US); Ashish Garg, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/812,841

(22) Filed: Jul. 15, 2022

(65) Prior Publication Data

US 2023/0164042 A1 May 25, 2023

Related U.S. Application Data

(60) Provisional application No. 63/264,339, filed on Nov. 19, 2021.

(51) Int. Cl.
*H04L 43/026* (2022.01)
*H04L 67/63* (2022.01)

(52) U.S. Cl.
CPC ............ *H04L 43/026* (2013.01); *H04L 67/63* (2022.05)

(58) Field of Classification Search
CPC .............................. H04L 67/63; H04L 43/026
See application file for complete search history.

(56) References Cited

U.S. PATENT DOCUMENTS

| | | | |
|---|---|---|---|
| 6,665,725 B1 * | 12/2003 | Dietz | .................... H04L 49/205 709/228 |
| 6,915,433 B1 | 7/2005 | Barber | |
| 8,782,435 B1 | 7/2014 | Ghose | |
| 9,027,091 B2 * | 5/2015 | Mardikar | ................ G06F 21/62 726/4 |
| 10,097,464 B1 * | 10/2018 | Conlon | .................. H04L 47/125 |
| 10,120,993 B2 | 11/2018 | Taveau et al. | |
| 2005/0071643 A1 | 3/2005 | Moghe | |

(Continued)

OTHER PUBLICATIONS

International Search Report and Written Opinion in PCT Appl. No. PCT/US2022/079272 dated Feb. 28, 2023, 9 pages.

(Continued)

*Primary Examiner* — Aftab N. Khan
*Assistant Examiner* — Patrick F Ngankam
(74) *Attorney, Agent, or Firm* — Kowert, Hood, Munyon, Rankin & Goetzel, P.C.; Dean M. Munyon

(57) ABSTRACT

Techniques are disclosed relating to component-based risk evaluation using flow signature values. In various embodiments, the disclosed techniques include a server system providing a service usable to provide various computing operations for requesting users, where the server system includes various components with associated component identifier values. In various embodiments, different sequences of the components are usable to perform different ones of the various computing operations. In response to a request from a client device, the server system may perform a requested computing operation via a processing flow that utilizes a particular sequence of components. In various embodiments, the server system generates a particular flow signature value for that particular processing flow, including by generating a flow identifier value by combining component identifier values for the particular sequence of components.

20 Claims, 6 Drawing Sheets

(56) References Cited

U.S. PATENT DOCUMENTS

| | | |
|---|---|---|
| 2005/0171937 A1 | 8/2005 | Hughes et al. |
| 2010/0293533 A1 | 11/2010 | Andrade et al. |
| 2012/0155831 A1* | 6/2012 | Uchida ............... G11B 27/034 |
| | | 386/E9.011 |
| 2013/0283356 A1 | 10/2013 | Mardikar et al. |
| 2017/0289134 A1 | 10/2017 | Bradley et al. |
| 2018/0123940 A1 | 5/2018 | Rimar et al. |
| 2020/0228489 A1 | 7/2020 | Shaikh et al. |

OTHER PUBLICATIONS

Sun et al., "Detecting Code Reuse in Android Applications Using Component-Based Control Flow Graph", IFIP International Information security conference; Jun. 4, 2014, pp. 142-155.

What is a Cmdb? A data warehouse for your IT environment, Sarah K. White, CIO.com, Jun. 15, 2021, 7 pages.

Continuous Digital Risk Management (DevRiskOps), Paul Mcavoy, RSA Labs, Jul. 29, 2019, 3 pages, https://community.securid.com/t5/rsa-labs-ideas/continuous-digital-risk-man.

MD5, Wikipedia, Feb. 5, 2022, 13 pages, https://en.wikipedia.org/w/index.php?title=MD5&oldid=1070032706.

The Pandas DataFram: Mek Working With Data Delightful, Mirko Stojiljkovic, Real Python, Feb. 14, 2022, 37 pages.

What is an MD5 checksum value and what is it used for?, Sep. 11, 2012, 3 pages, Intel Corporation.

\* cited by examiner

500

---

Provide a service usable to perform a plurality of computing operations for requesting users, where the server system includes components with corresponding component identifier values
502

↓

Receive, from a client device, a request to perform a particular computing operation
504

↓

Perform the particular computing operation via a particular processing flow in which a particular sequence of the components perform a series of tasks associated with the particular computing operation
506

↓

Generate a particular flow signature value for the particular processing flow
508

↓

Generating a flow identifier value for the particular processing flow by combining component identifier values for the particular sequence of components used to perform the series of tasks
510

↓

Performing a hash operation based on the flow identifier value to generate the particular flow signature value
512

FIG. 5

COMPONENT-BASED RISK EVALUATION TECHNIQUES USING PROCESSING FLOW SIGNATURES

RELATED APPLICATIONS

The present application claims priority under 35 U.S.C. § 119 to U.S. Provisional Patent Application No. 63/264,339 filed on Nov. 19, 2021, the disclosure of which is hereby incorporated by reference as if entirely set forth herein.

BACKGROUND

Technical Field

This disclosure relates generally to computer system reliability, and more particularly to component-based risk evaluation techniques that utilize processing flow signature values.

Description of the Related Art

A server system may provide various services (e.g., web services) in which the computing resources of the server system perform computing operations on behalf of a requesting entity, such as an end user. A given service may be made up of many individual computing operations that may be performed for an end user. In performing a given one of these computing operations, the server system may use a processing flow that utilizes a combination of many different components. These components may be shared by multiple different processing flows to support the various computing operations. Accordingly, as the server system services a request, the associated processing flow may utilize a combination of many different components to generate the desired result for the user. In some instances, however, this component-based approach may present various technical challenges, particularly as the number of components utilized by the server system increases.

BRIEF DESCRIPTION OF THE DRAWINGS

FIG. 5 is a flow diagram illustrating an example method for performing component-based risk evaluation using processing flow signatures, according to some embodiments.

DETAILED DESCRIPTION

Figure 1:
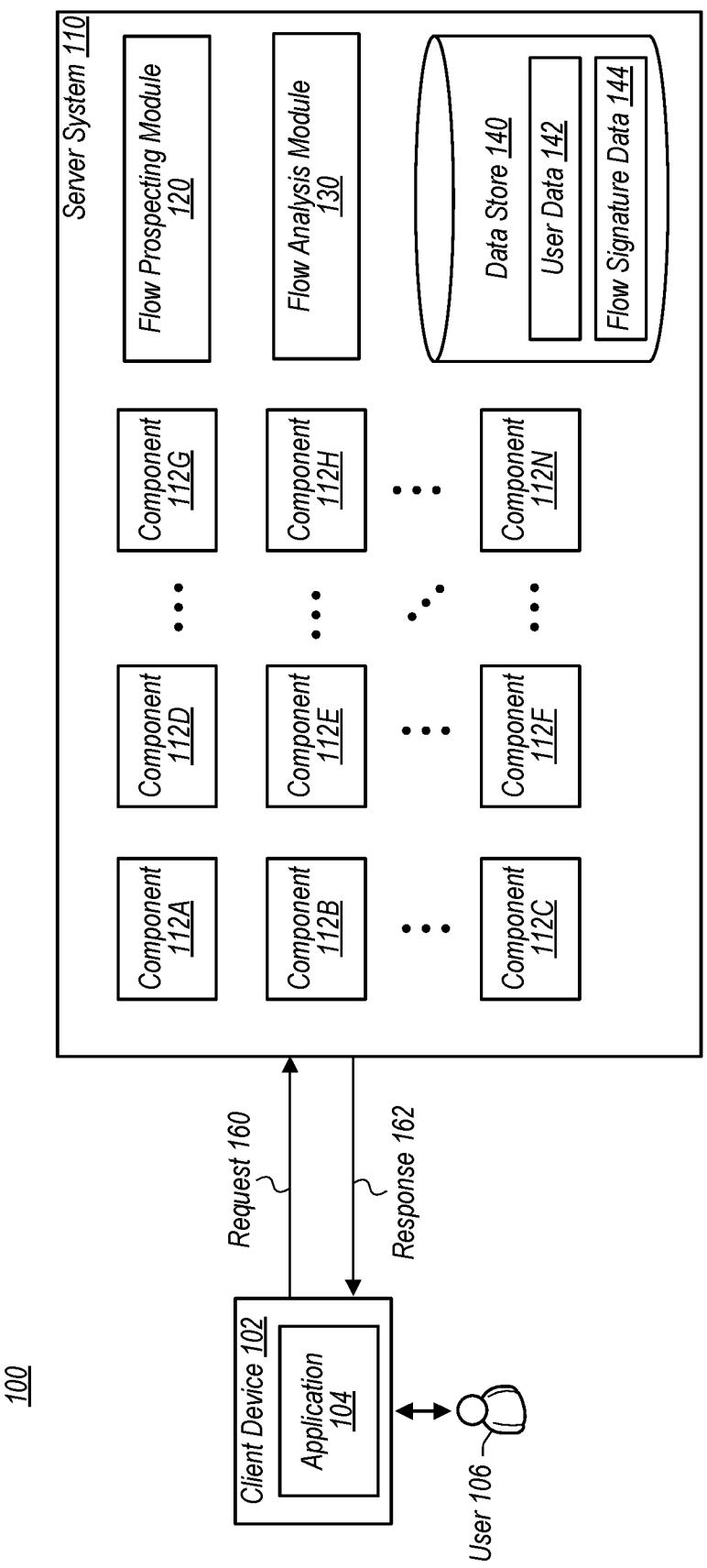
FIG. 1 is a block diagram illustrating an example server system that utilizes a set of components, according to some embodiments.

A server system may provide various services (e.g., web services) in which the computing resources of the server system (including hardware or software elements of the server system) perform computing operations on behalf of a requesting entity, such as an end user. Non-limiting examples of web services a server system may provide include email services, streaming media services, map-based services, online payment services, retail services, etc.

A given service may be made up of many individual computing operations (also referred to herein as "experiences") that may be performed for an end user. Consider, as a non-limiting example, an embodiment in which a server system (e.g., implemented using multiple different, geographically diverse datacenters) provides an online payment service to many users (e.g., millions of users). In this example embodiment, the online payment service may allow end users to perform various computing operations, such as creating a user account, adding funding sources, sending and receiving funds to other user accounts, etc.

In performing a given one of these computing operations, the server system may use a processing flow that utilizes a combination of multiple (and, potentially, many) "components." As used herein, the term "component" refers to a hardware or software element used to perform a portion of the computation used to complete the requested computing operation. Various non-limiting examples of components are described in detail below. In the context of a configuration management system utilized by the server system, a "component," as used herein, may also be referred to as a "configuration item" (or "CI"), where the configuration management system may use various processes to monitor the status of the individual CI's in use in the system. In this disclosure, the term "processing flow" refers to sequence of components used by the server system to perform a requested computing operation (e.g., transferring funds between user accounts, as one non-limiting example).

A server system may include a large number (e.g., thousands, tens of thousands, etc.) of distinct components. These components may be created by, and shared between, different teams or divisions within the entity operating the server system such that different components are "owned" or managed by different internal entities. In such an embodiment, when designing the processing flows that will be used to perform the computing operations offered, different combinations of components may be selected, used, and shared to support the various computing operations. Accordingly, as the server system services a request, the associated processing flow may utilize a combination of many different components to generate the desired result for the user. Note, however, that there may be changes to any number (e.g., thousands) of these components on a daily basis, for example as part of ongoing software development efforts. Further, in some instances, the number of components used in a given processing flow can be large (e.g., 100, components, 1,000 components, 10,000 components, etc.).

While this component-based approach does facilitate scalability by allowing components to be created, managed, and shared between internal entities and experiences, it also presents various technical problems. For example, the processing flow for a given computing operation may change over time. Consider, as a non-limiting example, a particular component that is used in the processing flow associated with ten different computing operations included in the service provided by the server system. In this example, if there is a change to this particular component, it will affect the ten different processing flows associated with these ten different computing operations. Accordingly, if this change to the particular component negatively impacts the performance of this particular component, the performance of each of these ten different processing flows may also be negatively impacted (or prevented altogether).

Using prior techniques, there is little to no visibility about the underlying components included in a given processing flow, the changes made to those components, the performance of those components, the decommissioning of components, etc. Further, using prior techniques, these components may be treated as a group or "batch" (e.g., tier-1 databases) rather than as individual components. Accordingly, it may be difficult or impossible to determine, for a given computing operation, the identity and status of the underlying components included in the processing flow used to perform that given computing operation. Further, using prior approaches, there is no suitable technique that may be used to quantify the risk (e.g., to the server system, the service(s) it provides, the business it supports, etc.) associated with the constant changes to the components in the system.

In various embodiments, the disclosed techniques address these technical problems by using component-based risk evaluation techniques that use processing flow signature values to monitor and analyze the processing flows—and therefore the components—utilized by the server system. For example, in various embodiments, the disclosed techniques include assigning some or all of the components within a server system with a corresponding component identifier value. In some embodiments, for example, a component identifier value is an immutable name that uniquely identifies a particular component. As a requested computing operation is performed by the server system, these component identifier values may be used to create a flow identifier value indicative of the sequence (that is, the identity and order) of components included in the particular processing flow used, by the server system, to perform the requested computing operation. Stated differently, as different components in the processing flow are used, the identifier values for these different components are logged and combined (e.g., concatenated) to form a flow identifier value that indicates the sequence of components used by the server system to perform a given processing flow. Various embodiments further include creating a processing flow signature value by performing a hash operation on (that is, computing a hash value from) this flow identifier value. In one non-limiting embodiment, the disclosed techniques store a processing flow signature value, optionally along with one or more other items of information, associated with some or all of the processing flows performed by the server system. Non-limiting examples of additional information that may be logged includes: a flow identifier value corresponding to the flow signature value, a timestamp indicating a time at which the processing flow was performed, a counter indicating the number of times that the processing flow with a particular flow signature value was performed within a given time period, etc.

Maintaining these items of information may provide various technical benefits. For example, when a processing flow is completed and a new processing flow signature value generated, that processing flow signature value may be compared to processing flow signature values generated for previous instances of that processing flow. In the event that the new signature value fails to match the previous signature values, the disclosed techniques may determine that there has been a change to one or more of the components included in that processing flow. Once this change has been detected, various embodiments include using the flow identifier values for this processing flow to identify which of the underlying component(s) has changed. Non-limiting examples of changes to the components may include: additions of new components to the processing flow, modification of existing components in the processing flow, and removal or decommissioning of components included in the processing flow. Once the relevant components have been identified (e.g., in a real-time or near real-time manner), further investigation into the nature and extent of the changes to these components can be performed. Accordingly, various disclosed embodiments provide improved visibility into the identity and status of the combination of components included in the various (and, potentially, numerous) processing flows used by the server system. Additional technical benefits provided by various disclosed embodiments are described in more detail below.

Referring now to FIG. 1, block diagram 100 depicts a server system 110 that includes a set of components 112A-112N (or, collectively, components 112), a flow prospecting module 120, a flow analysis module 130, and a data store 140. In various embodiments, server system 110 provides one or more computing resources as part of a service (e.g., a web service) that may be used directly by end users or that may be integrated with (or otherwise used by) services provided by third-parties. As one non-limiting example, server system 110, in some embodiments, provides an online payment service that may be used by end users to perform online financial transactions (e.g., sending or receiving funds) or utilized by merchants to receive funds from users during financial transactions. Note, however, that this embodiment is described merely as one non-limiting example. In other embodiments, server system 110 may provide any of various suitable services, such as an email service, a streaming media service, etc. Additionally note that, in some embodiments, a "server system" (such as server system 110) may be implemented using a single machine. In other embodiments, however, a "server system" may be implemented using multiple machines executing (e.g., at one or more datacenters) for the benefit of a single entity. For example, in some embodiments, server system 110 may be implemented using multiple machines located at one or more geographically remote datacenters.

FIG. 1 further includes client device 102 operated by user 106. Client device 102 may be any of various suitable computing devices, such as a smartphone, laptop computer, desktop computer, tablet computer, etc. that user 106 may use to access the service(s) provided via server system 110. For example, in various embodiments, client device 102 executes a software application 104, such as a web browser or a service-specific software application, usable to access one or more computing resources provided by the server system 110. In the depicted embodiment, user 106 uses client device 102 to send a request 160 to perform a computing operation via a service provided by server system 110. As a non-limiting example, consider an embodiment in which the requested computing operation specified by request 160 is to check an account balance of a user account of the user 106.

In various embodiments, the server system 110 utilizes different combinations of components 112 to perform the various computing operations available via the service the server system 110 provides. For example, to service request 160, the server system 110 implements a processing flow that utilizes a sequence of components 112 to perform a series of tasks (or "sub-operations") necessary to complete the requested computing operation. Non-limiting examples of these tasks could include any of various different computational sub-operations, such as user-verification, risk evaluation, data retrieval, routing, load balancing, etc., that need to be completed in order to accomplish the broader computing operation requested by the user. As a simplified example for the purposes of illustration, assume that the processing flow utilized by the server system 110 uses the following sequence of components 112 to perform the requested computing operation for request 160: component 112A, 112B, 112D, 112E, and 112N. (Note that, in many embodiments, a processing flow may include a sequence of any number (e.g., hundreds, thousands, etc.) of components 112.) Once the processing flow has completed execution (e.g., by successfully performing the requested operation, through an unexpected termination of the processing flow, etc.), the server system 110 may provide a response 162 to the client device 102.

Non-limiting examples of "components" that may be included in a processing flow include an asset, a container that is running a service, a virtual machine, a third-party library, a physical asset, business logic that is embedded into an application, a Kubernetes cluster, etc. Consider, as a non-limiting example, an instance in which a service (provided by the server system 110) runs an API that may be used by requesting entities (e.g., end users, third-party systems, etc.) to send a request to that service. In this example, the service running the API would be considered a "component." Further, assume that this API has a particular configuration such that it accepts, in a properly formatted API request, a particular set of parameters. This configuration for the API, in various embodiments, will have an associated component identifier value. If that configuration is later changed (e.g., to modify the particular set of attributes included in an API request), that change would result in the assignment of a new identifier value for that component. When the flow signature value (e.g., hash value) for a processing flow that includes this service is later computed, this change to the configuration will result in a change to the signature value. As described herein, that change in signature value may be investigated further to identify the source of this change (the update to the API specification, in the current example).

Various embodiments include utilizing identifier values associated with components in the server system to track which components within the infrastructure of the server system 110 are in use for the various processing flows. As one non-limiting example, a processing flow may include the sequence of components 112 (or simply the set of components 112 that have been assigned a component identifier value) used by the server system 110 from the ingress point of a request (e.g., a request 160 from a user 106), to a database, through one or more software applications or microservices, to a point of egress at which a response is provided to the user. In various embodiments, the disclosed techniques include generating flow signature values for the processing flows utilized by the server system 110 to service client requests. In some embodiments, for example, the server system 110 generates a flow signature value as a hash value based on a concatenation (or other combination) of the identifier values for the sequence of components in the utilized processing flow. By using the component identifier values for each of the components in a processing flow and using these component identifier values to create the flow signature value, the disclosed techniques are capable of modeling the processing flow for a given computing operation. These flow identifier values and flow signature values may be generated and stored over time for many (or all) of the different processing flows used by the server system 110, which, in various embodiments, helps to identify any changes in the components 112 included in a processing flow.

In various embodiments, the disclosed techniques may be said to operate in two complementary (and, optionally, simultaneous) phases: a prospecting phase, and a reconciliation phase. In various embodiments, the reconciliation phase and prospecting phase may be said to operate as state machines within an overall autonomous system. During the prospecting phase, the flow prospecting module 120 generates flow signature values for the permissible processing flows that are permitted via the server system 110. That is, flow prospecting module 120 generates flow signature values for the sequences of components 112 that are permitted based on the logic and constraints of the individual components 112. In various embodiments, the prospecting operations may be repeated (e.g., on a periodic basis) to generate new and updated flow signature values as components are added to or removed from the server system 110. Flow prospecting module 120 and various embodiments of the prospecting phase are described in detail below with reference to FIG. 4.

The prospecting phase may be thought of as a "non-production" phase because, in various embodiments, the prospecting operations are performed independent of the requests being received and serviced by the server system 110. The reconciliation phase, by contrast, may be thought of as a "production phase" because, in various embodiments, the reconciliation operations discussed herein are performed based on the instantiated production environment used by server system 110 to service requests from clients. For example, as a request is serviced, a flow signature value may be created based on the component identifiers for the sequence of components used to service that request. This process of generating flow signature values for the processing flows used by the server system 110 may be performed for all (or any desired subset) of the requests received by the server system 110. Note that, in embodiments in which server system 110 hosts a large-scale service, server system 110 may receive many (e.g., millions) requests each day. In various embodiments, flow signature values generated either by the flow prospecting module 120 during a prospecting operation, or by the server system 110 while performing computing operations to service requests from requesting users, may be stored as part of flow signature data 144 in data store 140 included in (or accessible to) server system 110.

In various embodiments, the disclosed techniques include analyzing these flow signature values generated during the reconciliation phase, which may provide various technical benefits—particularly in the context of server systems providing large-scale services used by many users. For example, in various embodiments the disclosed techniques improve the ability to monitor the use of, and detect risks associated with, the various (and often numerous) processing flows and components 112 utilized by the server system 110.

Various embodiments of flow analysis module 130 and the disclosed flow analysis techniques are described in detail below with reference to FIG. 3. In various embodiments, these flow analysis techniques may provide various technical benefits to the server system 110. For example, in various embodiments the flow analysis techniques include using the flow signature values to detect changes to the components 112 included in the processing flows used by server system 110. As described below, this may enable the efficient tracking and monitoring of components 112 utilized in business-critical processing flows such that, when a change is made to one or more components 112, this change may be detected in a fast and efficient manner. Further, in various embodiments, the flow analysis operations include tracking the number of times that different processing flows are used during a given time interval, which may be particularly useful for tracking changes in "velocity" with respect to the server system 110 as a whole and with respect to specific processing flows.

Additionally, in some embodiments, the flow analysis techniques include detecting "unexpected" processing flows performed by the server system 110. For example, as explained below, the flow analysis module 130 may compare the flow signature values generated during the reconciliation phase to the flow signature values generated during the prospecting phase and, if there is not a match, the processing flow associated with that flow signature value may be deemed "unexpected" and flagged for further investigation. By contrast, using prior techniques it may be difficult or impossible to detect when an "unexpected" processing flow has been used by the system. Further, in various embodiments, the flow analysis techniques include identifying a particular component (or components) as a point-of-failure in a processing flow. For example, as described below, in addition to a flow signature value, in various embodiments each processing flow will also have an associated "return code" (e.g., an HTTP status code) indicative of the outcome of the processing flow that may be used to determine whether a requested operation was successfully performed. If not, various embodiments include using the flow signature value (or the underlying flow identifier value) to identify a component that acted as a point-of-failure for the processing flow. This approach to identifying a point-of-failure component may provide significant technical benefits, for example by allowing a malfunctioning component in a processing flow—out of, for example, thousands of possible components—to be identified in a fast and computationally efficient manner.

Figure 2:
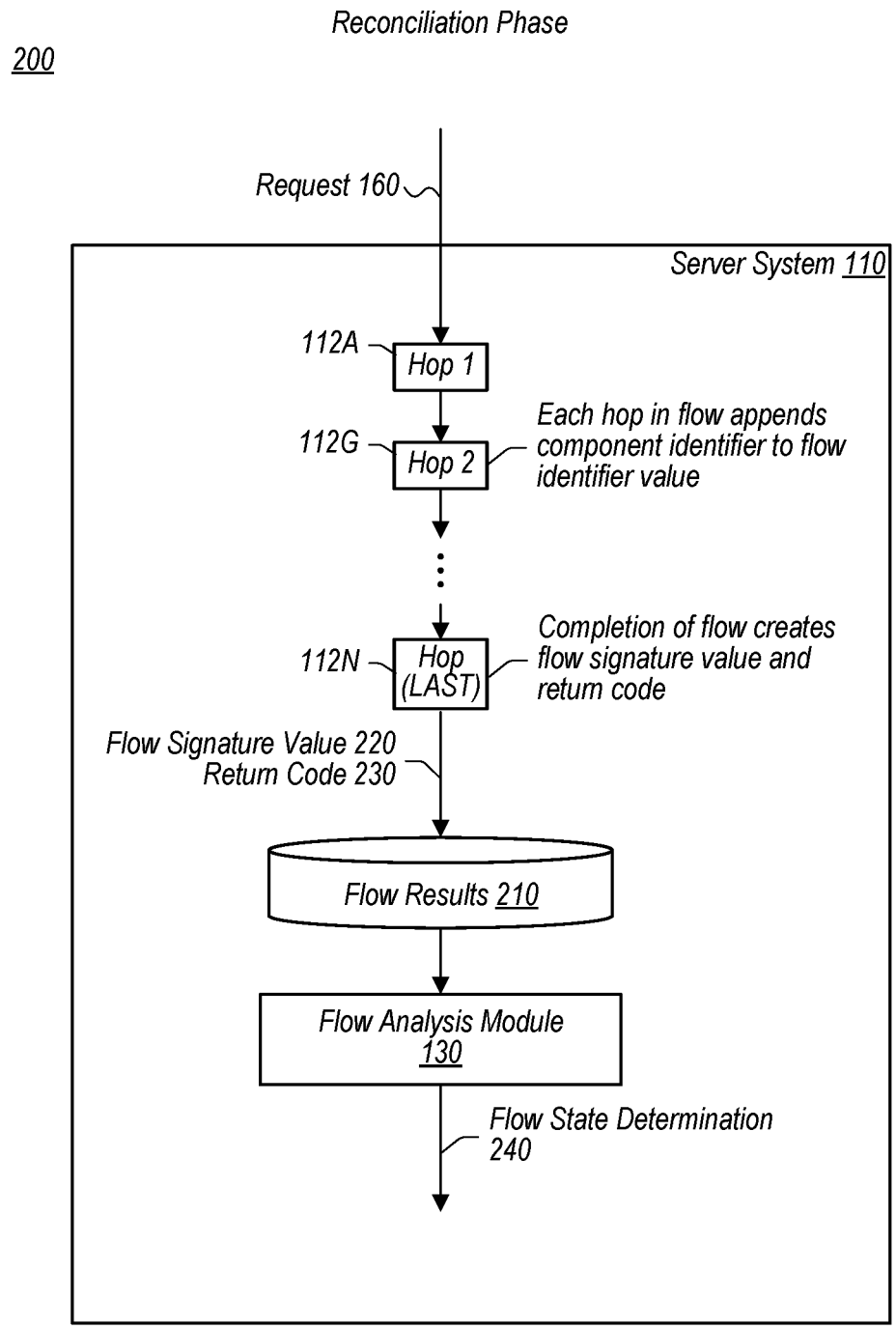
FIG. 2 is a block diagram illustrating an example server system generating a flow signature value while implementing a processing flow, according to some embodiments.

Referring now to FIG. 2, block diagram 200 depicts an embodiment in which server system 110 generates a flow signature value 220 while implementing a processing flow to service a request 160 for a user 106.

As noted above, in various embodiments the server system 110 utilizes different combinations of components 112 to perform computing operations provided via the service that it hosts. The various components 112 used by a particular processing flow may be utilized in a particular sequence so as to perform a series of tasks needed to complete the requested computing operation. As shown in FIG. 2, in some embodiments these components 112 may be referred to as "hops" to signify that a component 112 in a processing flow is one step of many taken to complete a requested operation.

In various embodiments, each component 112 in the processing flow assists in creating a flow identifier value for that processing flow. For example, in some embodiments the flow identifier value for a particular processing flow is a combination (e.g., a concatenation) of the components 112 used in that processing flow in the order in which the respective components 112 were utilized. For example, in various embodiments, a flow identifier value (e.g., an alphanumeric value) is created by appending the component identifier value (e.g., a unique, immutable name) of each successive component 112 in the processing flow, and a flow signature value 220 is created by taking a hash of the flow identifier value. Accordingly, in various embodiments this flow signature value 220 is specific to the sequence of components 112 used in the corresponding processing flow, and the same flow signature value 220 will be generated each time that same processing flow (that is, the exact same sequence of components 112) is used by the server system 110 to service a request.

With reference to the non-limiting example shown in FIG. 2, for instance, the depicted processing flow first utilizes component 112A. In some embodiments, once component 112A completes its task, it may add its unique component identifier value to a flow identifier value for the particular processing flow. In this non-limiting example, the component identifier value for component 112A would be the first and only identifier value included in the flow identifier value at this point. In various embodiments, the flow identifier value may be passed (e.g., in an HTTP header field, such as a cookie) from component 112 to component 112 in the flow such that each subsequent component 112 can append their respective identifier value to the end (or beginning, in some implementations) of the running flow identifier value.

In the depicted embodiment, the last hop in the processing flow is component 112N. In various embodiments, the final component 112 in a processing flow may both add its identifier value to the flow identifier value and, once completed, generate a flow signature value 220 based on the flow identifier value. In various embodiments, the flow signature value 220 may be a hash value generated by taking a hash of the flow identifier value. As one non-limiting example, in some embodiment the md5 message-digest algorithm may be used to generate a flow signature value 220 based on the flow identifier value. Note, however, this is merely one non-limiting example and, in other embodiments, any suitable hashing algorithm may be used. Further, in other embodiments, the flow signature value 220 may be generated using other suitable encoding techniques (e.g., encoding techniques that do not utilize a hash function).

In the depicted embodiment, the flow signature value 220 is stored, along with a return code 230 (e.g., an HTTP status code), in flow results 210. As an example, for a particular utilization of a processing flow, the flow results 210 may include a corresponding data record that specifies the flow signature value 220 and the associated return code 230 (optionally along with one or more other items of information, e.g., a timestamp, as desired). For example, various embodiments include storing, in flow results 210, one or more of the flow identifier value, the processing flow signature value 220, the return code 230, and a timestamp associated with some or all of the processing flows performed by the server system 110 for a given period of time (e.g., week, month, year, etc., or indefinitely).

In various embodiments, a flow signature value 220 and return code 230 may be stored in flow results 210 for each (or any desired subset) of the processing flows utilized by the server system 110 for subsequent analysis. For example, as shown in FIG. 2, in various embodiments the flow results 210 may be accessed and analyzed by the flow analysis module 130. Various non-limiting embodiments of flow analysis module 130 are described in detail below with reference to FIG. 3. For the purposes of the present discussion, however, note that flow analysis module 130, in various embodiments, is operable to analyze the flow signature value 220 and return code 230 and, based on that analysis, generate a flow state determination 240. In various embodiments, this flow state determination 240 may include one or more items of information corresponding to the processing flow, which may be used for various flow analysis techniques described herein, for example to monitor and detect changes in flow velocity, detect unexpected processing flows, and identify point-of-failure components.

Figure 3:
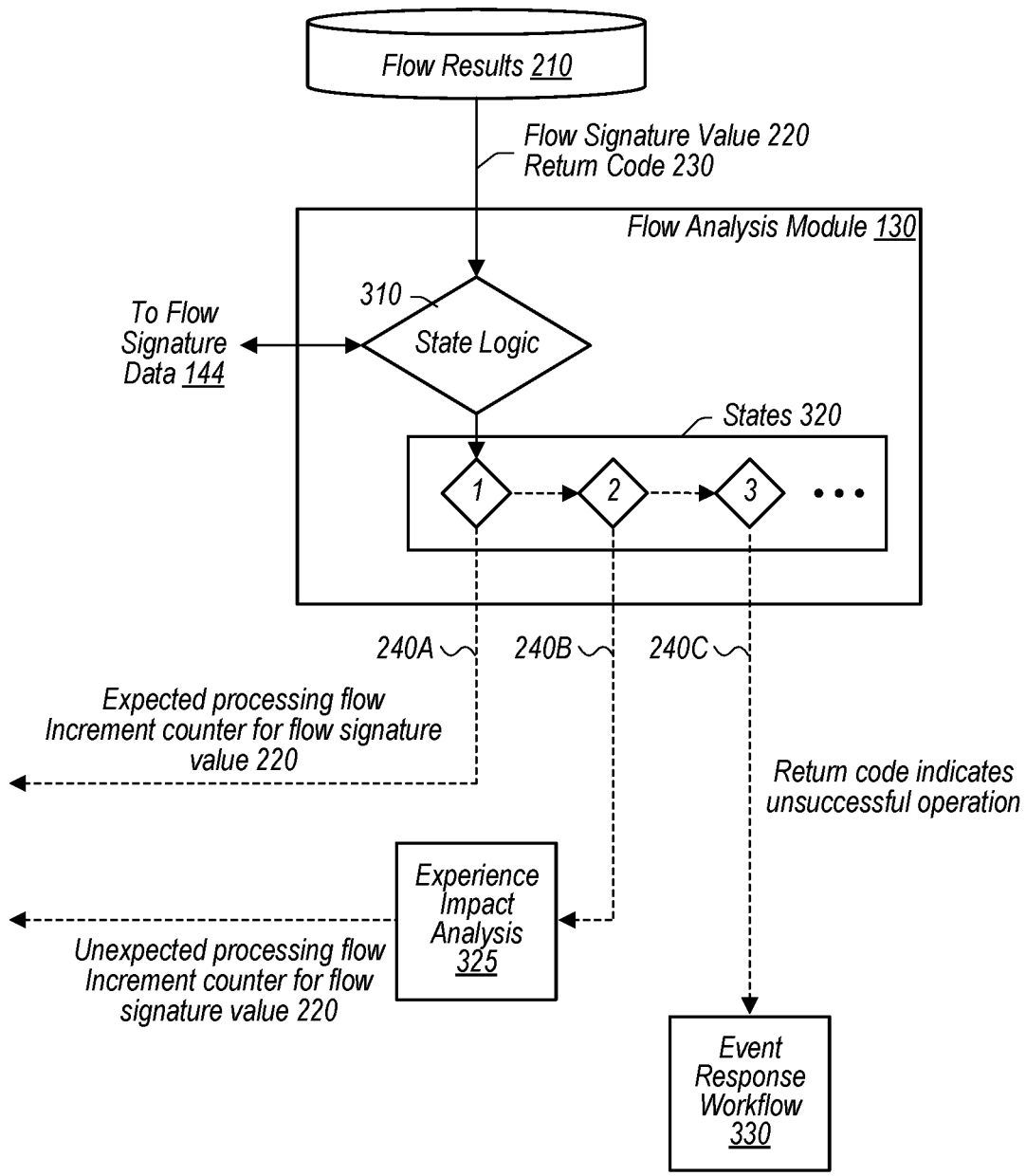
FIG. 3 is a block diagram illustrating an example flow analysis module, according to some embodiments.

Referring now to FIG. 3, block diagram 300 depicts an embodiment of flow analysis module 130 evaluating flow results 210 associated with the processing flows used by the server system 110 to perform requested computing operations. In the depicted embodiment, flow analysis module 130 is depicted as a state machine that includes state logic 310 and a set of states 320. (Note that, although only 3 states are explicitly depicted in FIG. 3 for clarity, this is simply one non-limiting embodiment. In other embodiments, flow analysis module 130 may reach any suitable number of states based on the state logic 310.)

In various embodiments, state logic 310 utilizes flow signature data 144 (e.g., including the flow signature values generated during the prospecting phase) to analyze the flow signature value 220 and return code 230 and generate an appropriate flow state determination 240. As a non-limiting example, for each result (e.g., stored as a character string formatted as a "flow signature value 220: return code 230" value) in flow results 210, the state logic 310 may split the result such that flow signature value 220 is added to a set "E" (corresponding to "experiences"), the return code 230 is added to a set "RC," and a counter associated with that particular flow signature value 220 and return code 230 combination is incremented. Further, in some such embodiments the state logic 310 may then evaluate each of the "experiences" in the set E. For example, as described in more detail below, if the return code 230 indicates that a requested operation was not successfully completed, the flow analysis module 130 module may increment a counter associated with that return code 230 and trigger an event-response workflow. If, however, the return code 230 indicates that the requested operation was successful, the flow analysis module 130 may determine whether the flow signature value 220 matches a flow signature value 220 generated during prospecting. If so, an appropriate counter may be incremented to track that occurrence. If not, the flow analysis module 130 may initiate an impact analysis workflow for further investigation. Various non-limiting embodiments of these flow analysis operations are now described in more detail below.

For example, as shown in FIG. 3, in various embodiments the flow analysis module 130 determine an appropriate flow state determination 240 by determining whether the return code 230 for the processing flow indicates whether the request was successful or not. In some embodiments, for example, the return codes may be HTTP status codes that indicate whether a requested operation specified by a request (e.g., request 160) has been successfully completed. In such embodiments, for example, the 2xx class of status codes (e.g., the 200 OK status code) indicates that the request was successful, while the 5xx class of status codes (e.g., the 500 Internal Server Error status code) indicates that the server was unsuccessful in complete the requested operation.

If the return code 230 indicates that a processing flow was unsuccessful (indicated by State 3 in FIG. 3), the flow analysis module 130 may generate a flow state determination 240C indicating that the requested operation was unsuccessful. In the depicted embodiment, for example, this flow state determination 240 may be provided to an event response workflow 330 for further investigation. In various embodiments the flow analysis techniques include identifying a particular component 112 (or components 112) as a point-of-failure in a processing flow. For example, if the return code 230 indicates that a requested operation was not successful, the flow analysis module 130 (or another module in server system 110) may use the flow signature value 220 to identify a component 112 that caused the processing failure. As a non-limiting example, while servicing a request, one of the components 112 in the processing flow may be malfunctioning, causing the processing flow to fail to complete the requested computing operation. In some such embodiments, the disclosed techniques may stop appending component identifier values to the flow identifier value at a point of failure such that, when a processing flow fails, the disclosed techniques may identify the final component 112 specified in the flow identifier value as a point of failure for the processing flow. As another non-limiting example, if a particular processing flow for a particular computing operation is intended to include a sequence of 40 different components 112 and the flow identifier value indicates that the flow stopped at the 15th component-component 112M-this component 112M may be identified as a potential source of the failure. In various embodiments, this may enable problematic components 112 to be identified and remedied more quickly than using prior techniques, thereby improving the operation of the server system as a whole.

If, however, the return code 230 indicates that the requested operation was successfully performed, the flow analysis module 130 may determine an appropriate flow state determination 240 by comparing a flow signature value 220 to the flow signature data 144 to determine whether the flow signature value 220 matches a flow signature value 220 generated during the prospecting operations. If there is such a match (indicated by State 1 in FIG. 3), that flow signature value 220 may be said to be "expected" because it matches a flow signature value for a processing flow that was deemed to be permissible by the flow prospecting module 120 during prospecting. In FIG. 3, for example, in response to determining both that the return code 230 indicates the requested operation was successful and that the flow signature value 220 matches a flow signature value previously generated during the prospecting operation, the flow analysis module 130 may generate a flow state determination 240A indicative of this result. As noted above, in various embodiments the flow analysis operations include tracking the number of times that different processing flows are used during a given time interval. For example, in FIG. 3, based on a determination that the processing flow was successful (based on return code 230) and that the flow signature value 220 was "expected," the flow analysis module 130 increments a counter associated with the flow signature value 220 that tracks the number of times that flow signature value 220 was generated during a particular time period.

In various embodiments, the flow analysis module 130 may be operable to detect "unexpected" processing flows performed by the server system 110. For example, if there is not a match between the flow signature value 220 and any of the flow signature values generated during prospecting (indicated by State 2 in FIG. 3), that flow signature value 220 may be said to be "unexpected" because it does not match a flow signature value for a processing flow that was deemed to be permissible by the flow prospecting module 120 during prospecting. In FIG. 3, for example, in response to determining that the return code 230 indicates the requested operation was successful and that the flow signature value 220 does not match a flow signature value 220 previously generated during the prospecting operation, the flow analysis module 130 may generate a flow state determination 240B indicative of this result. In the depicted embodiment, for example, this flow state determination 240 may be provided to an experience impact analysis 325 for further investigation. For example, this unexpected processing flow could correspond to a malicious operation that was successfully performed via the server system 110, or the unexpected processing flow could simply correspond to a computing operation that was not yet discovered during the prospecting phase. By autonomously identifying and flagging these processing flows for further investigation, the disclosed techniques enable for the fast and computationally efficient resolution of potential problems as those problems arise. Further note that, in various embodiments, the flow analysis operations also include tracking the number of times that "unexpected" processing flows are detected. For example, in FIG. 3, the flow analysis module 130 increments a counter associated with the "unexpected" flow signature value 220 to track the number of times that this flow signature value 220 was generated during a particular time period.

Information about an occurrence of the flow signature value 220, including the flow signature value 220, the return code 230, a timestamp, the counter, etc., may be stored as part of flow signature data 144. Such information may be particularly useful, for example, in detecting changes in velocity associated with various processing flows (both "expected" and "unexpected") utilized in the server system 110 over time. For example, in some embodiments, the flow analysis module 130 may track the number of times a particular processing flow is used, by the server system 110, during successive time intervals and identify changes in that processing flow's use over time. This information may be valuable on its own, providing the organization operating the server system 110 with insight regarding how frequently the different processing flows are used and how that use changes over time.

Further, in some embodiments, the flow signature values 220 or velocity information may be used to detect changes in processing flows or the respective components 112 included therein. For example, in some embodiments, the components 112 included in a given processing flow may change and, when this change occurs, there will be a resulting change in the flow signature value 220 for that processing flow. By monitoring the flow signature values 220, the disclosed techniques facilitate the detection of changes in processing flows (e.g., components added to the flow, components removed from the flow, changes in the sequence of components in the flow, changes to the configuration of components in the flow, or any combination thereof). Accordingly, once a change in the flow signature value 220 has been detected, one may determine that there has been a change in the underlying processing flow, which may be investigated further. In various embodiments, detecting and identifying changes in a processing flow based on a change in its signature value is both less error-prone and less computationally demanding than other available techniques (e.g., comparing the list of component identifiers for the components included in the processing flow).

In some embodiments, the server system 110 may maintain (or have access to) a list (implemented using any suitable data structure or collection) that maps a component identifier value to a corresponding component 112. For example, this operation may be performed by component system of record 402 described below with reference to FIG. 4. In various embodiments, once it has been determined that there has been a change to the processing flow (based on a change in the associated flow signature value 220), various embodiments include determining which of the component(s) 112 in that processing flow have changed. For example, in some embodiments, this determining includes comparing the flow identifier value (e.g., the set of concatenated component identifier values) for the current instance of the processing flow to the flow identifier value for a previous instance (e.g., the most-recent previous instance) of the processing flow to determine how these values differ. Once the changed component(s) 112 have been identified, the extent of those changes may be investigated. For example, a change management system may be consulted to determine what changes were made to a given component 112 in the flow.

Various embodiments further allow the entity operating the server system 110 to define thresholds used to determine whether a change is significant enough to warrant further investigation or action (that is, if the risk posed by this change is deemed "acceptable"). For example, in some embodiments, certain important or business-critical components 112 or processing flows may be flagged (e.g., within the data structure providing the mapping of component identifier value to corresponding component 112) such that, when a change is detected in these processing flows or components 112, an indication of this change may be generated.

Note that, although only three states 320 are explicitly shown in FIG. 3, this non-limiting embodiment is depicted merely as an example and, in other embodiments, state logic 310 may reach one or more additional states based on the analysis of the flow signature values 220 and return codes 230. For example, in some embodiments one or more additional states 320 may leverage volumetric differences between the active cycle (e.g., a current time period) and results from one or more previous cycles (e.g., flow signature values 220 and return codes 230 generated during previous time periods or during prospecting). As a non-limiting example, in some embodiments the flow analysis operations may detect changes in velocity associated with one or more processing flows, where "velocity" refers to the number of times a processing flow is utilized by the server system 110 during a given cycle. Note that, in various embodiments, these other states 320 (e.g., states beyond the three depicted in FIG. 3) may add determination for reoccurrence, flapping states, and anomalous availability or security results of the flow signature values 220.

Further note that, although the flow analysis module 130 is shown as part of the reconciliation phase in the production environment, this depicted embodiment is provided as merely one non-limiting example. In other embodiments, some or all of the flow analysis operations described herein may be performed in a non-production environment (e.g., as part of the prospecting phase).

Figure 4:
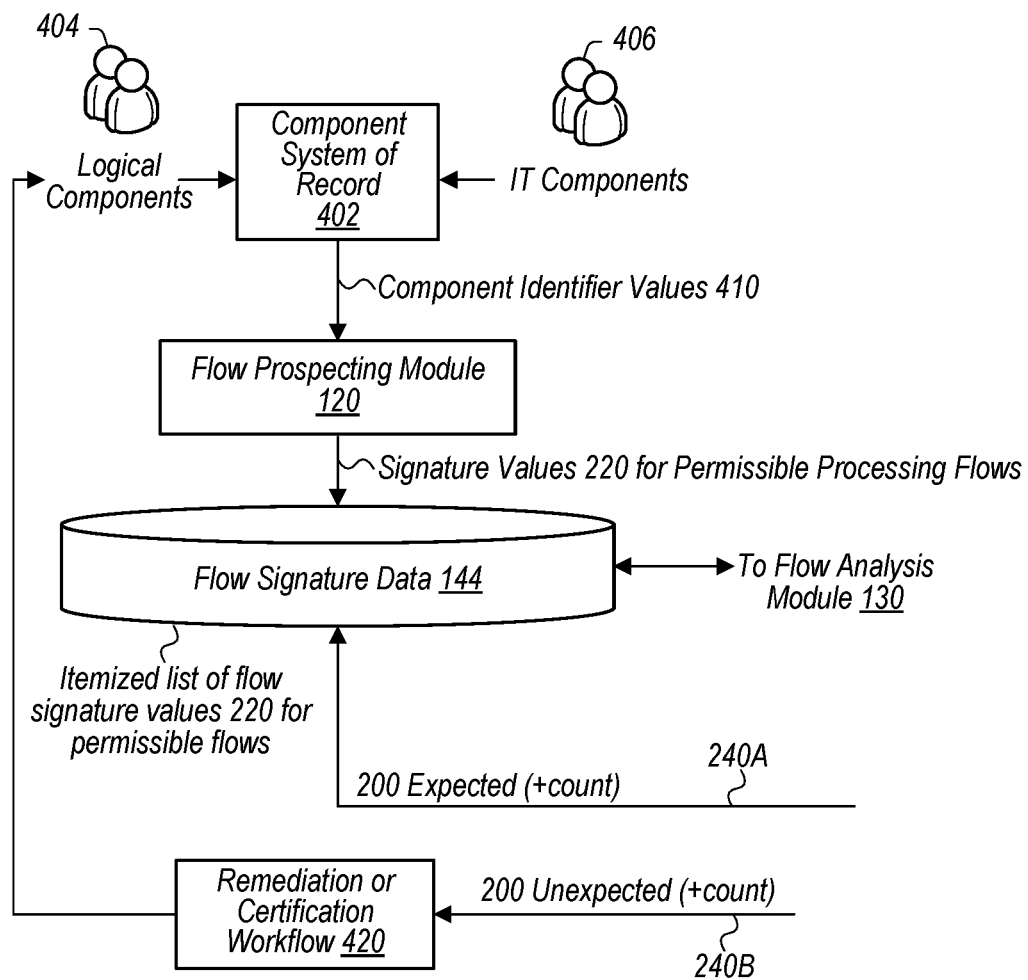
FIG. 4 is a block diagram illustrating an example flow prospecting module during a prospecting phase, according to some embodiments.

Referring now to FIG. 4, block diagram 400 depicts a flow prospecting module 120 during a prospecting phase, according to some embodiments. In various embodiments, the flow prospecting module 120 generates flow signature values 220 for the permissible processing flows that are permitted via the server system 110.

In the embodiment depicted in FIG. 4, block diagram 400 includes a component system of record 402, which, in various embodiments, is a data management system that acts as an authoritative source for data relating to the components 112 utilized by the server system 110. In various embodiments, through continued development efforts within an organization (e.g., by various software development or business teams within a company), both logical and IT components 112 may be added to the server system 110. In FIG. 4, for example, business users 404 within the organization may develop logical components 112 and IT users 406 within the company may develop IT components 112. As these components 112 are created and on-boarded, unique, immutable component identifier values 410 for the components 112 may be added to the component system of record 402. That is, in various embodiments, as a component 112 is added to the server system 110, a unique, immutable component identifier 410B may be added to the component system of record 402 for that component 112.

In various embodiments, the flow prospecting module 120 is operable to compute flow signature values for the processing flows that are permitted, using different combinations of the components 112, via the server system 110. That is, in various embodiments the flow prospecting module 120 is a software agent that computes flow signature values 220 for any possible flow that is allowed by the configuration deployed by the users 204 or 206 of the organization operating the server system 110. For example, in some embodiments the flow prospecting module 120 takes the configuration information provided by the human users 204 or 206 and applies automation to identify every permitted sequence of components 112, generating a flow signature value 220 for each such sequence. In various embodiments, each flow signature value may be said to represent a corresponding itemized capability of the server system 110 and the sum of all of its constituent components 112 in sequential order.

In various embodiments, this process may be autonomously repeated such that, as the component system of record 402 is updated, new corresponding flow signature values 220 are created. That is, in various embodiments the flow prospecting module 120 is constantly running and generating a (potentially very large) list of flow signature values 220 (e.g., as hash values) indicative of the permissible processing flows that are possible via the components 112 in the server system 110. In some embodiments, these flow signature values 220 may be stored in tables (or in any other suitable data-storage format) and may be used, for example, by the flow analysis module 130, for example as described above with reference to FIG. 3.

As shown in FIG. 4, in various embodiments the prospecting phase receives feedback from the flow analysis module 130. In various embodiments, the flow analysis module 130 provides the flow state determinations 240 for subsequent use in the prospecting phase or for use in subsequent flow analysis operations. For example, in various embodiments the flow signature data 144 may be used to store counter information associated with the different flow signature values 220 for expected processing flows. Further, as depicted in FIG. 4, information relating to "unexpected" processing flows may be utilized by the system. For example, in FIG. 4, flow state determination 240B corresponding to an "unexpected" processing flow may be provided to a remediation or certification workflow 420 for further analysis. In some embodiments, the output of this remediation or certification workflow 420 may be utilized, for example, by business users 404 to revise aspects of one or more components 112 (e.g., logical components) used by the server system 110.

Example Methods

Referring now to FIG. 5, a flow diagram illustrating an example method 500 for performing component-based risk evaluation using processing flow signatures is depicted, according to some embodiments. In various embodiments, method 500 may be performed by server system 110 of FIG. 1 to generate a flow signature value 220 based on a sequence of components 112 used, by the server system 110, to perform a requested computing operation. For example, server system 110 may include (or have access to) a non-transitory, computer-readable medium having program instructions stored thereon that are executable by the server system 110 (e.g., by one or more computer systems included in the server system 110) to cause the operations described with reference to FIG. 5. In FIG. 5, method 500 includes elements 502-512. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the server system 110 provides a service that is usable to perform various computing operations for requesting users 106. As described above, in various embodiments the server system 110 includes a set of (potentially numerous) components 112 that have corresponding unique component identifier values. In various embodiments, different combinations of the components 112 are usable to perform the various computing operations included in the service hosted by server system 110.

At 504, in the illustrated embodiment, the server system 110 receives, from a client device 102, a request to perform a particular computing operation. As a non-limiting example in embodiments in which the server system 110 hosts an online payment service, the requested computing operation may be to transfer funds from one user account to another. At 506, in the illustrated embodiment, the server system 110 performs the particular computing operation via a particular processing flow. In various embodiments, the processing flow includes a particular sequence of components 112 performing a series of tasks that are associated with the particular computing operation.

At 508, in the illustrated embodiment, the server system 110 generates a particular flow signature value 220 for the particular processing flow. In FIG. 5, element 508 includes sub-elements 510-512. Note, however, that this embodiment is provided merely as one non-limiting example and, in other embodiments, generating the particular flow signature value for the particular processing flow may include additional or different sub-elements than those shown in FIG. 5. At 510, in the illustrated embodiment, the server system 110 generates a flow identifier value for the particular processing flow by combining component identifier values for the particular sequence of components used to perform the series of tasks. At 512, in the illustrated embodiment, the server system 110 performs a hash operation based on the flow identifier value to generate the particular flow signature value. As a non-limiting example, in some embodiments the flow signature value is generated as an md5 hash value, though any suitable hashing technique may be used, as desired.

As noted above, various disclosed embodiments include performing flow analysis operations based on the flow signature values generated by server system 110. In various embodiments, method 500 may include one or more such flow analysis operations. For example, in some embodiments, method 500 includes determining that the particular flow signature value for the particular processing flow matches a previously generated flow signature value (e.g., generated during a prospecting phase) corresponding to a permissible processing flow that is permitted by the server system 110 and, in response, incrementing a counter associated with the particular flow signature value. In such embodiments, the counter may indicate the number of times, during a particular time period, that the particular processing flow was utilized by the server system 110.

Further, in various embodiments, method 500 includes flow analysis operations related to tracking the "velocity" associated with one or more processing flows utilized by the server system 110. For example, in some embodiments method 500 includes the server system 110 generating, during a first time period, a plurality of instances of the particular flow signature value while servicing repeated requests, from a plurality of users, to perform the particular computing operation, and, for each of the plurality of instances, incrementing a counter indicating a number of times, during the first time period, that the particular processing flow was utilized by the server system. In such embodiments, method 500 may further include comparing the first counter to a second counter associated with the particular flow signature value, where the second counter indicates a number of times, during a second time period, that the particular processing flow was utilized by the server system 110 and, based on the comparing, detecting a change in frequency of the particular processing flow between the first and second time periods.

Additionally, in various embodiments, method 500 includes determining that a particular flow signature value does not match any signature values included in a list of previously generated (e.g., during a prospecting phase) flow signature values corresponding to permissible processing flows that are permitted by the server system 110. For example, as described above, in some embodiments the flow analysis module 130 may determine that a processing flow is "unexpected" in response to the corresponding flow signature value 220 not matching any of the flow signature values generated by the flow prospecting module 120 during its prospecting operations.

In some embodiments, method 500 includes detecting when a requested operation was not successfully performed. For example, in some embodiments, method 500 includes detecting, based on a return code 230 associated with the particular flow signature value 220, an unsuccessful outcome of the particular computing operation and, in response to the detecting, identifying a particular component, of the particular sequence of components, as a point of failure for the particular processing flow. In some embodiments, for instance, identifying the particular component includes determining a final component identifier value included in the flow identifier value for the particular processing flow and, using this final component identifier value, identifying a final component in the particular sequence of components used in the particular processing flow.

Further, as noted above, in various embodiments method 500 includes performing various prospecting operations (e.g., by a flow prospecting module 120). In some such embodiments, method 500 includes accessing a set of component identifier values associated with a set of components utilized by the server system 110 to provide the service and generating a list of flow signature values corresponding to permissible processing flows that are permitted using the different combinations of the plurality of components in the server system. In some such embodiments, method 500 further includes autonomously generating the updated list of flow signature values on a periodic basis, including by accessing an updated set of identifier values associated with an updated set of components utilized by the server system to provide the service and generating a corresponding updated list of flow signature values corresponding to permissible processing flows that are permitted using different combinations of the updated set of components.

Example Computer System

Figure 6:
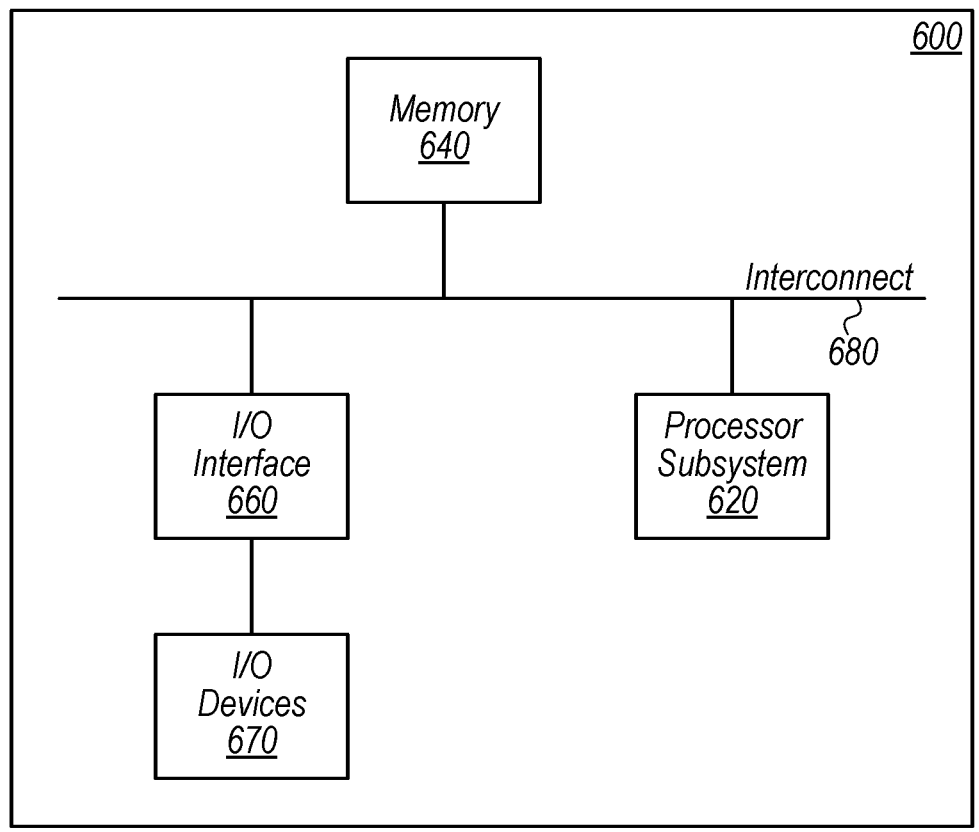
FIG. 6 is a block diagram illustrating an example computer system, according to some embodiments.

Referring now to FIG. 6, a block diagram of an example computer system 600 is depicted, which may implement one or more computer systems, such as server system 110 (or one or more computer systems included in server system 110) of FIG. 1, according to various embodiments. Computer system 600 includes a processor subsystem 620 that is coupled to a system memory 640 and I/O interfaces(s) 660 via an interconnect 680 (e.g., a system bus). I/O interface(s) 660 is coupled to one or more I/O devices 670. Computer system 600 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 600 is shown in FIG. 6 for convenience, computer system 600 may also be implemented as two or more computer systems operating together.

Processor subsystem 620 may include one or more processors or processing units. In various embodiments of computer system 600, multiple instances of processor subsystem 620 may be coupled to interconnect 680. In various embodiments, processor subsystem 620 (or each processor unit within 620) may contain a cache or other form of on-board memory.

System memory 640 is usable to store program instructions executable by processor subsystem 620 to cause system 600 perform various operations described herein. System memory 640 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as system memory 640. Rather, computer system 600 may also include other forms of storage such as cache memory in processor subsystem 620 and secondary storage on I/O devices 670 (e.g., a hard drive, storage array, etc.). In some embodiments, these other forms of storage may also store program instructions executable by processor subsystem 620.

I/O interfaces 660 may be any of various types of interfaces configured to couple to and communicate with other devices, according to various embodiments. In one embodiment, I/O interface 660 is a bridge chip (e.g., Southbridge) from a front-side to one or more back-side buses. I/O interfaces 660 may be coupled to one or more I/O devices 670 via one or more corresponding buses or other interfaces. Examples of I/O devices 670 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 670 includes a network interface device (e.g., configured to communicate over Wi-Fi, Bluetooth, Ethernet, etc.), and computer system 600 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail. As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC.

What is claimed is:

1. A method, comprising:
providing, by a server system, a service usable to perform a plurality of computing operations for requesting users, wherein the server system includes a plurality of components, different combinations of which are usable to perform different ones of the plurality of computing operations of the service;
receiving, at the server system from a client device, a request to perform a particular computing operation;
identifying, by the server system based on the request, a set of components for a particular processing flow to complete the requested particular computing operation;
in response to the identifying, assigning, by the server system, component identifier values to the set of components for the particular processing flow;
performing, by the server system, the particular computing operation via a particular processing flow in which a particular sequence of the set of components perform a series of tasks associated with the particular computing operation; and
generating, by the server system during a first time period, a plurality of instances of a particular flow signature value while servicing repeated requests from a plurality of users to perform the particular computing operation, wherein generating an instance of the particular flow signature value for the particular processing flow includes:
generating a flow identifier value for the particular processing flow by combining the component identifier values assigned to the set of components for the particular sequence of components used to perform the series of tasks; and
for at least the instance of the particular flow signature value, incrementing a first counter indicating a number of times that the particular processing flow was utilized by the server system.

2. The method of claim 1, wherein the generating the particular flow signature value for the particular processing flow includes performing a hash operation based on the flow identifier value to generate the particular flow signature value.

3. The method of claim 1, further comprising:
determining that the particular flow signature value matches a previously generated flow signature value corresponding to a permissible processing flow that is permitted by the server system; and
incrementing a first counter associated with the particular flow signature value, wherein the first counter indicates a number of times, during a first time period, the particular processing flow was utilized by the server system.

4. The method of claim 1, further comprising:
comparing the first counter to a second counter associated with the particular flow signature value, wherein the second counter indicates a number of times, during a second time period, that the particular processing flow was utilized by the server system; and
based on the comparing, detecting a change in frequency of the particular processing flow between the first and second time periods.

5. The method of claim 1, further comprising:
determining that the particular flow signature value does not match any signature values included in a list of previously generated flow signature values corresponding to permissible processing flows that are permitted by the server system;
identifying, by the server system based on the determining, that the particular processing flow is not permissible; and
in response to the identifying, determining, by the server system based on component identifier values of components in the particular sequence of the set of components, a given component of the particular sequence that is a point-of-failure.

6. The method of claim 1, further comprising:
detecting, based on a return code associated with the particular flow signature value, an unsuccessful outcome of the particular computing operation; and
in response to the detecting, identifying a particular component, of the particular sequence of components, as a point of failure for the particular processing flow.

7. The method of claim 6, wherein the identifying the particular component includes:
determining a final component identifier value included in the flow identifier value for the particular processing flow; and
using the final component identifier value, identifying a final component in the particular sequence of components used in the particular processing flow.

8. The method of claim 1, further comprising:
accessing, by the server system, a set of component identifier values associated with a set of components utilized by the server system to provide the service; and
generating, by the server system, a list of flow signature values corresponding to permissible processing flows that are permitted using the different combinations of the plurality of components in the server system.

9. The method of claim 8, further comprising:
autonomously generating, by the server system, updated lists of flow signature values on a periodic basis, including by:
accessing an updated set of identifier values associated with an updated set of components utilized by the server system to provide the service; and
generating a corresponding updated list of flow signature values corresponding to permissible processing flows that are permitted using different combinations of the updated set of components.

10. A server system, comprising:
at least one processor;
a non-transitory, computer-readable medium having instructions stored thereon that are executable by the at least one processor to cause the server system to:
provide a service usable to perform a plurality of computing operations for requesting users, wherein the server system includes a plurality of components, different combinations of which are usable to perform different ones of the plurality of computing operations of the service; and
generate, during a first time period, a plurality of instances of a particular flow signature value for a particular processing flow used to perform a particular computing operation for repeated requests from a plurality of users to perform the particular computing operation, wherein generating an instance of the particular flow signature value includes:
identifying a set of components for the particular processing flow to complete the particular computing operation;
assigning component identifier values to the set of components for the particular processing flow;
generating a flow identifier value, for the particular processing flow, using the component identifier values assigned to the set of components for a particular sequence of components used to perform the particular computing operation, and
incrementing, for the instance of the particular flow signature value, a first counter indicating a number of times that the particular processing flow was utilized by the server system.

11. The server system of claim 10, wherein the instructions are further executable to cause the server system to:
determine that the particular flow signature value matches a previously generated flow signature value corresponding to a permissible processing flow that is permitted by the server system; and
increment a first counter associated with the particular flow signature value, wherein the first counter indicates a number of times, during a first time period, the particular processing flow was utilized by the server system.

12. The server system of claim 10, wherein the instructions are further executable to cause the server system to:
during a first time period, generate a plurality of instances of the particular flow signature value while servicing repeated requests, from a plurality of users, to perform the particular computing operation; and
for each of the plurality of instances, increment a first counter indicating a number of times, during the first time period, that the particular processing flow was utilized by the server system.

13. The server system of claim 12, wherein the instructions are further executable to cause the server system to:
compare the first counter to a second counter associated with the particular flow signature value, wherein the second counter indicates a number of times, during a second time period, that the particular processing flow was utilized by the server system; and
based on the comparison, detect a change in frequency of the particular processing flow between the first and second time periods.

14. The server system of claim 10, wherein the instructions are further executable to cause the server system to:
determine that the particular flow signature value does not match any signature values included in a list of previously generated flow signature values corresponding to permissible processing flows that are permitted by the server system.

15. The server system of claim 10, wherein the instructions are further executable by the at least one processor to cause the server system to:
access a set of component identifier values associated with a set of components utilized by the server system to provide the service; and
generate a list of flow signature values corresponding to permissible processing flows that are permitted using the different combinations of the plurality of components in the server system.

16. A method, comprising:
providing, by a server system, a service usable to perform a plurality of computing operations for requesting users, wherein the server system includes a plurality of components, different combinations of which are usable to perform different ones of the plurality of computing operations of the service; and
identifying, by the server system based on the request, a set of components for a particular processing flow to complete the requested particular computing operation;
in response to the identifying, assigning, by the server system, component identifier values to the set of components for the particular processing flow;
creating, by the server system during a first time period, a plurality of instances of a particular flow signature value while servicing repeated requests from a plurality of users to perform the particular computing operation, wherein creating an instance of the particular flow signature value includes:

generating a flow identifier value, for the particular processing flow, using the component identifier values assigned to the set of components for a particular sequence of components used, by the server system, to perform the particular computing operation; and for one or more of the plurality of instances, incrementing, a first counter indicating a number of times that the particular processing flow was utilized by the server system.

17. The method of claim 16, further comprising:

detecting, based on a return code associated with the particular flow signature value, an unsuccessful outcome of the particular computing operation; and in response to the detecting, identifying a particular component, of the particular sequence of components, as a point of failure for the particular processing flow.

18. The method of claim 17, wherein the identifying the particular component includes:

determining a final component identifier value included in the flow identifier value for the particular processing flow; and using the final component identifier value, identifying a final component in the particular sequence of components used in the particular processing flow.

19. The method of claim 16, further comprising:

accessing, by the server system, a set of component identifier values associated with a set of components utilized by the server system to provide the service; and generating, by the server system, a list of flow signature values corresponding to permissible processing flows that are permitted using the different combinations of the plurality of components in the server system.

20. The method of claim 19, further comprising:

autonomously generating, by the server system, updated lists of flow signature values on a periodic basis, including by:

accessing an updated set of identifier values associated with an updated set of components utilized by the server system to provide the service; and generating a corresponding updated list of flow signature values corresponding to permissible processing flows that are permitted using different combinations of the updated set of components.

* * * * *